United States Patent
Westermann et al.

(10) Patent No.: US 6,658,690 B1
(45) Date of Patent: Dec. 9, 2003

(54) CONNECTING PIECE FOR CONNECTING A WIPER BLADE TO A WIPER ARM

(75) Inventors: Klaus-Juergen Westermann, Malsch (DE); Jurgen Roekens, Steenokkerseel (BE); Dirk Herinckx, Drieslinter (BE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 09/830,595

(22) PCT Filed: Aug. 8, 2000

(86) PCT No.: PCT/DE00/02636

§ 371 (c)(1),
(2), (4) Date: Jul. 3, 2001

(87) PCT Pub. No.: WO01/15945

PCT Pub. Date: Mar. 8, 2001

(30) Foreign Application Priority Data

Aug. 31, 1999 (DE) .......................................... 199 41 499

(51) Int. Cl.[7] .................................................. B60S 1/40
(52) U.S. Cl. .................................. 15/250.32; 15/250.44
(58) Field of Search ........................ 15/250.32, 250.44, 15/250.43, 250.361, 250.451, 250.452

(56) References Cited

U.S. PATENT DOCUMENTS

| | | | | |
|---|---|---|---|---|
| 4,967,438 A | * | 11/1990 | Arai et al. | ................ 15/250.32 |
| 5,618,124 A | * | 4/1997 | Chen | .............................. 403/3 |
| 5,937,474 A | * | 8/1999 | Hussaini | .................. 15/250.32 |

FOREIGN PATENT DOCUMENTS

| | | | | |
|---|---|---|---|---|
| DE | 4127101 | * | 2/1993 | .............. 15/250.32 |
| DE | 196 18 307 A | | 11/1997 | |
| EP | 0455520 | * | 11/1991 | .............. 15/250.32 |
| EP | 0 585 811 A | | 3/1994 | |
| EP | 0598653 | * | 5/1994 | .............. 15/250.32 |
| EP | 0 694 459 A | | 1/1996 | |
| EP | 0 863 058 A2 | | 9/1998 | |
| FR | 2 786 449 A | | 6/2000 | |
| GB | 2 322 069 A | | 8/1998 | |

* cited by examiner

*Primary Examiner*—Gary K. Graham
(74) *Attorney, Agent, or Firm*—Michael J. Striker

(57) ABSTRACT

A connecting piece for connecting a wiper arm to a wiper blade is proposed, which includes yielding regions, so that wiper arms of the most various sizes can be received.

10 Claims, 7 Drawing Sheets

CONNECTING PIECE FOR CONNECTING A WIPER BLADE TO A WIPER ARM

BACKGROUND OF THE INVENTION

The invention is based on a connecting piece for connecting a wiper blade and a wiper arm.

Connecting pieces for connecting the wiper arm to the wiper blade are already known, for instance from European Patent Disclosure EP 0 863 058 A2, but the connecting piece shown there is embodied in multiple parts, so that different adapter parts have to be used for each of the differently sized wiper arms.

SUMMARY OF THE INVENTION

The connecting piece of the invention has the advantage over the prior art that because it has elastic regions it has an auto-adaptive nature and thus is usable for many wiper arms of different sizes. It can moreover be produced in one piece, for instance by a injection molding process, which is a substantial advantage upon installation since there is not need first to determine which adapter piece fits the particular end of a wiper arm. This is of particular importance especially because as a rule the installation is done by the vehicle. driver himself, that is, by a layman rather than a professional.

It is especially advantageous if the elastic regions are formed in the form of resilient tabs, since then the connecting piece can be installed without being destroyed on the wiper arm end. Because the resilient tabs have a plurality of stop faces which correspond to differently sized wiper arm ends and which upon installation each automatically move into the correct position, the result is an auto-adaptive characteristic, which makes mistake-free installation substantially easier.

If one region is embodied as a yielding plateau, high torsional stability is obtained, combined with a high dimensional tolerance.

If the yielding nature of the plateau is due to ribs that have an angle of less than 90° from the wiper arm, then when the connecting piece is removed from the wiper arm a self-locking effect is brought about, which further enhances the strength of the connection between the wiper arm and the wiper blade.

If the connecting piece is provided with a resilient region for multiple positions that are associated with variously sized wiper arm ends, then it proves to be especially advantageous if in the resilient region, in each of these positions, a bracing action is exerted on the wiper arm by stabilizing elements.

Because for locking the connecting piece to the wiper blade the body or the means for receiving and bracing the wiper blade have elastic projections on which there are protuberances perpendicular to the direction of the wiper arm end, the force for attaching the connecting piece to the wiper arm and removing it from it can be adjusted easily and precisely by means of the size of the protuberances.

BRIEF DESCRIPTION OF THE DRAWINGS

The invention is described below in terms of an exemplary embodiment in conjunction with the drawings.

Shown are.

DETAILED DESCRIPTION OF THE PREFERRED EMBODIMENTS

Figure 1:
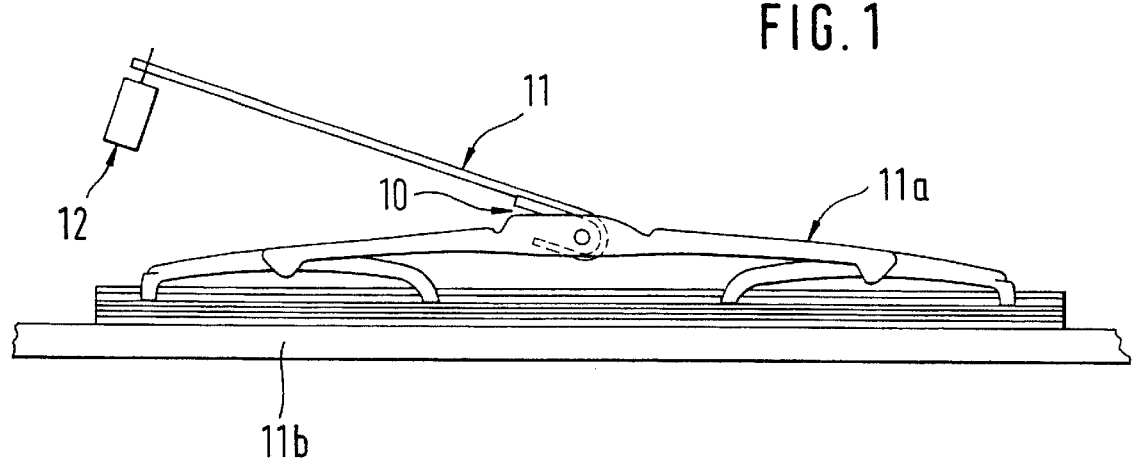
FIG. 1, a connecting piece according to the invention in the installed position, in a schematic illustration.

In FIG. 1, a connecting piece 10 with a wiper arm 11 and a wiper blade 11a can be seen. The wiper arm 11 has two ends; its lower end is connected to a wiper motor 12, and its upper end is bent 180° in hooklike fashion. The wiper blade 11a is braced on a windshield lib.

Figure 1A:
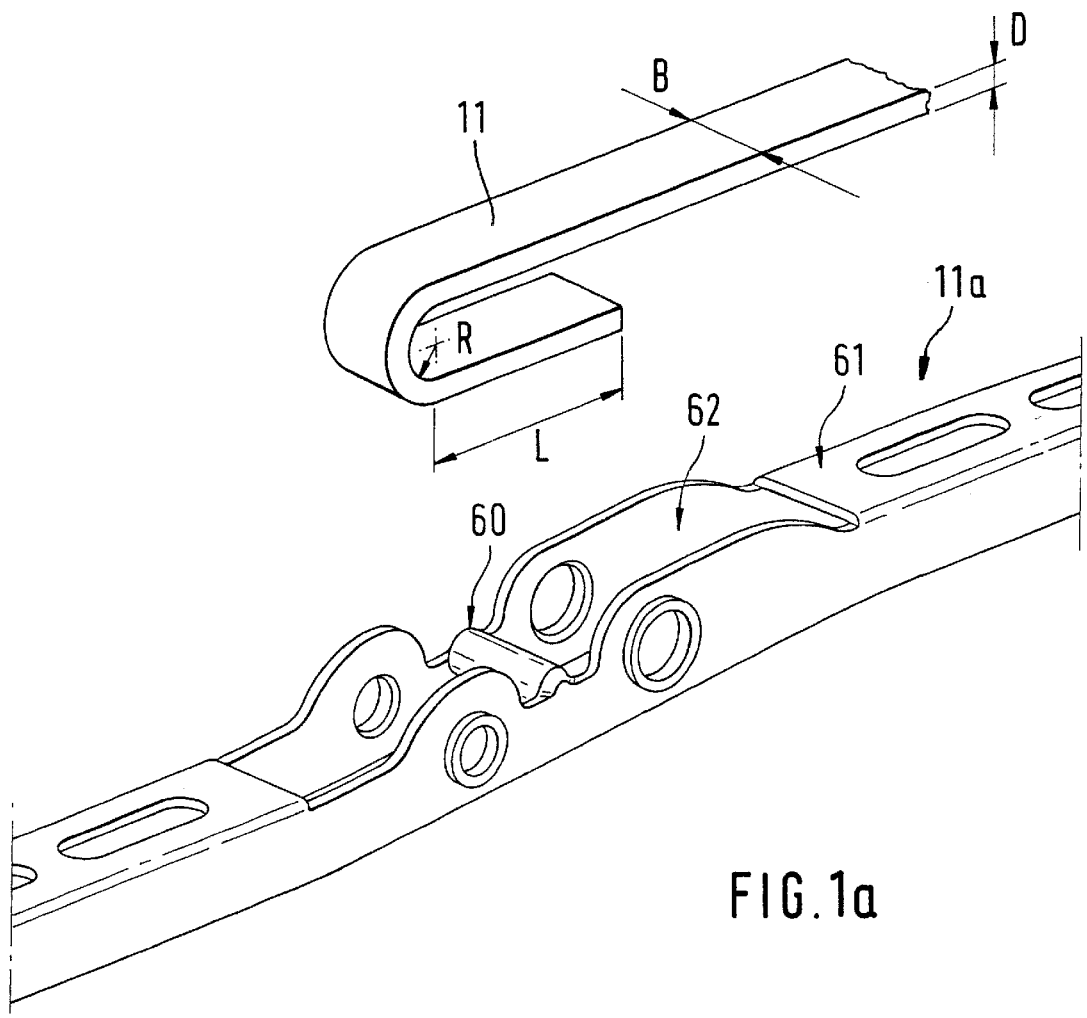
FIG. 1a, a detail of a wiper blade with a fastening element and a wiper arm end, in a perspective view.

In FIG. 1a, the upper end of the wiper arm 11 and a detail of the wiper blade 11a are shown. The end of the wiper arm 11 having the thickness D and the width B has a hooklike 180° bend of radius R. The bent portion has the length L. The wiper blade 11a has a cylindrical shaft 60, extending transversely to the longitudinal axis of the wiper blade, and with this cylindrical shaft, the wiper blade is supported rotatably on the wiper arm 11.

Figure 2:
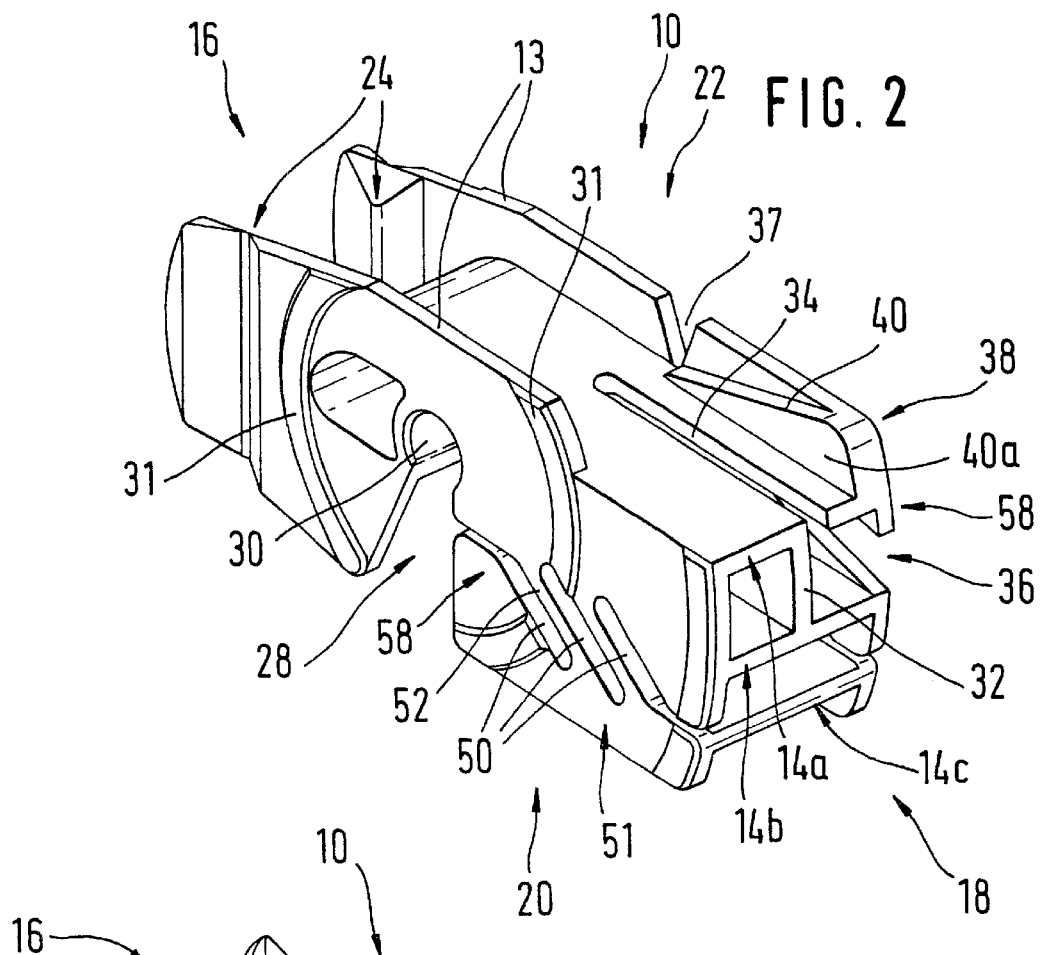
FIGS. 2 and 3, a connecting piece of the invention in a perspective view.
Figure 3:
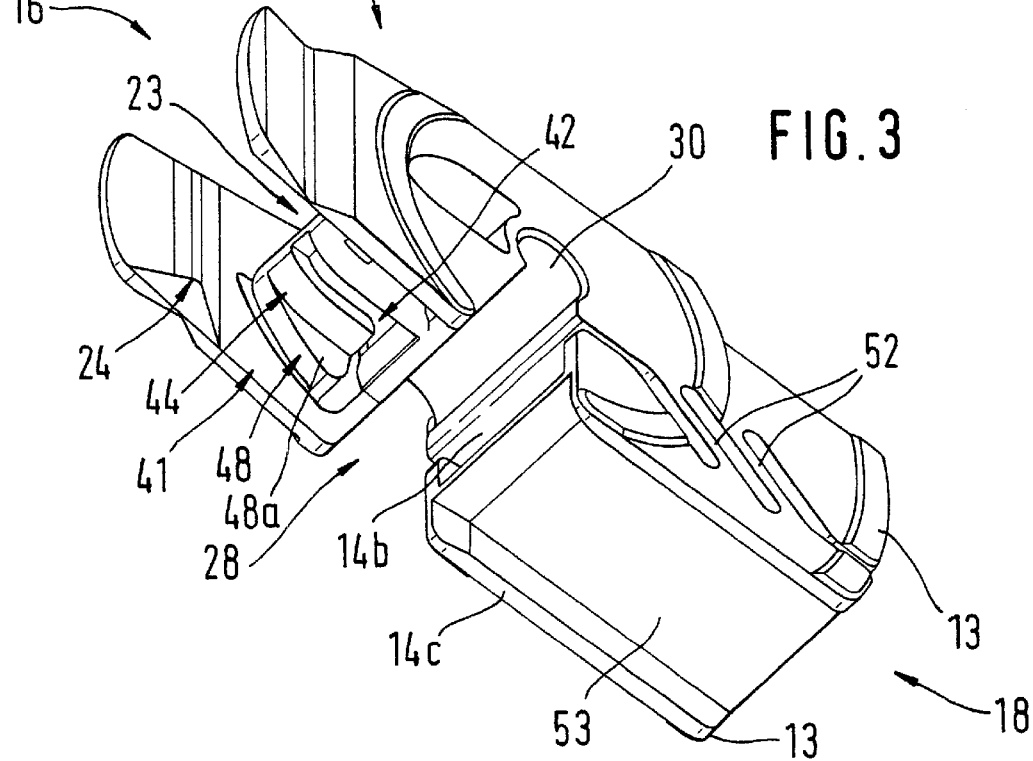
Figure 7:
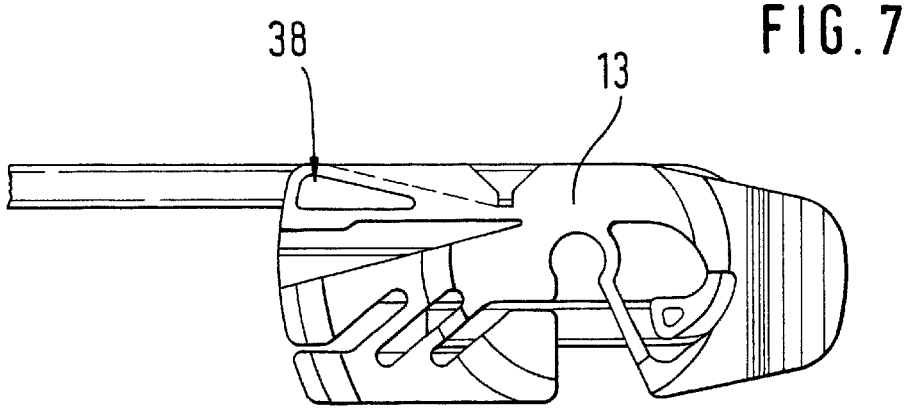
FIG. 7, a side view of a connecting piece of the invention, mounted on a narrow wiper arm end with a small bending radius.
Figure 9:
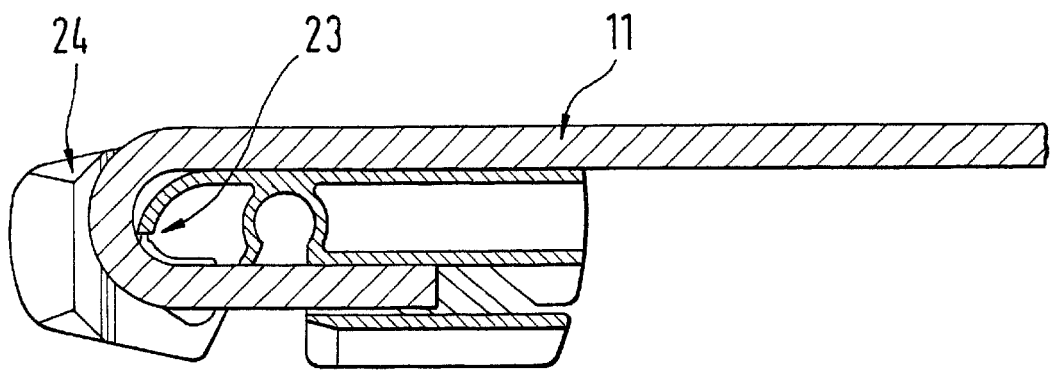
FIG. 9, a section through a connecting piece of the invention with a narrow wiper arm end.
Figure 10:
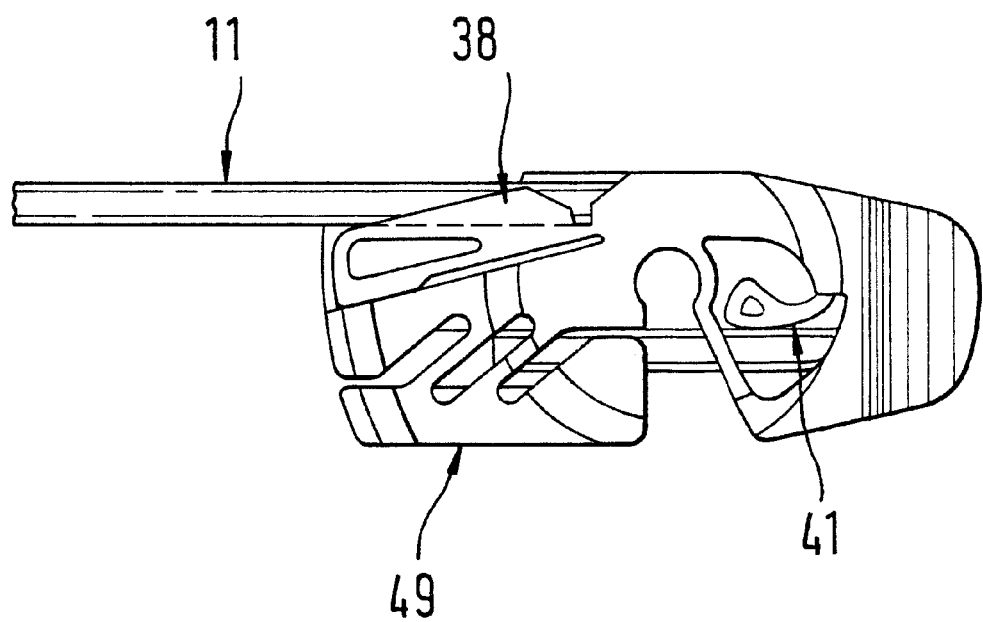
FIG. 10, a side view of a connecting piece of the invention, mounted on a wide wiper arm end with a small bending radius.
Figure 11:
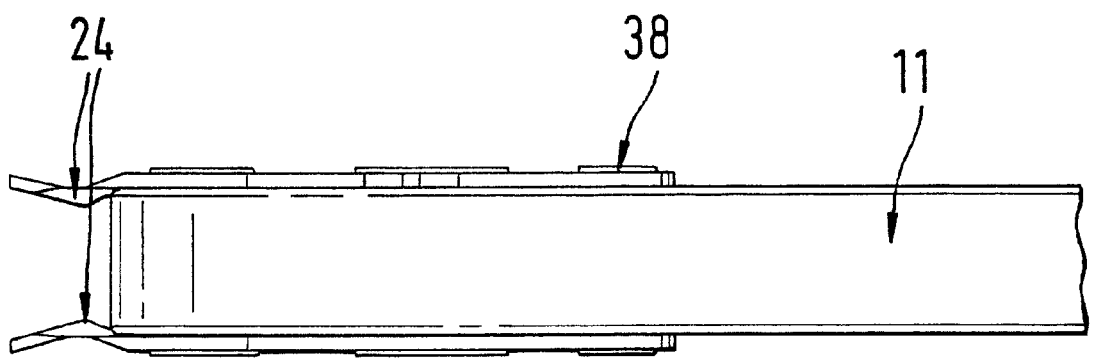
FIG. 11, a plan view on a connecting piece of the invention with a wide wiper arm end.

In FIGS. 2 and 3, an exemplary embodiment of the connecting piece 10 of the invention is shown in more detail. It substantially comprises a hollow body with two side walls 13, which laterally define three transverse walls, that is, an upper, a middle and a lower face 14a, 14b, 14c. At the top and bottom, the walls 13 protrude past the three transverse walls or faces 14a, 14b and 14c, and the wiper blade 11a in the installed position is braced on the outer faces of the walls 13 (FIGS. 7 and 9).

In the installed position on the wiper arm 11, the connecting piece 10 has a front end 16, remote from the wiper motor 12, in the direction of which the walls 13 taper. The connecting piece 10 also has a rear end 18, toward the wiper motor 12, and an underside 20 toward the windshield 11b and a top side 22 remote from the windshield 11b.

On its underside 20, the connecting piece 10 has a continuous transverse groove 28, which extends over the width of the connecting piece. The transverse groove 28 forms keyhole-shaped recesses 28 in the walls 13, and each of these recesses merges with a respective circular recess 20. The transverse groove 28 extends as far as the uppermost transverse wall that has the upper face 14a. The groove bottom of the transverse groove 28 is formed by a partial hollow cylinder for fitting over the shaft 60.

On each of the outer sides of the walls 13 is a respective raised, annular stop face 31, which is concentric with the center of the circular recesses 30.

Between the walls 13 and parallel to them, the transverse walls of the upper face 14a and the middle face 14b are joined at the rear end 18 by a support wall 32, along which the uppermost face 14a has an elongated recess 34. As a result, the transverse walls of the faces 14a, b, the support wall 32 and the left-hand wall 13 form a hollow profile of rectangular cross section.

In the right-hand wall 13, in the region of the elongated recess 34, there is a wedge-shaped recess 36 opening toward the rear end 18. It extends from the rear end 18 to near the circular recess 30 (FIG. 4).

At the end of the wedge-shaped recess 36, the right-hand wall 18 has a wedge-shaped notch 37. The notch is open toward the top and begins at the point of contact of the wall 13 with the uppermost face 14a.

As viewed from the rear end 18, this creates an inverted L-shaped, first yielding region in the form of a resilient tab 38. On the side of the wall 13 toward the elongated recess 34 is a wedge-shaped first extension 40, located on this resilient tab 38 and forming a first lateral stop face 40a.

Figure 4:
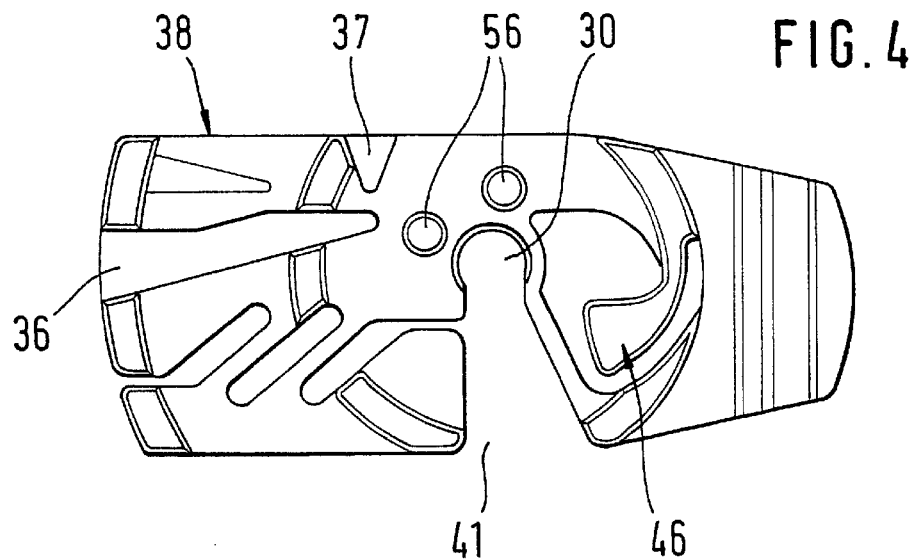
FIG. 4, a side view of a connecting piece of the invention.

As shown in FIG. 4, two pegs 56 are located on one of the walls 13, perpendicular to the wall 13, near the circular recess 30.

Figure 5:
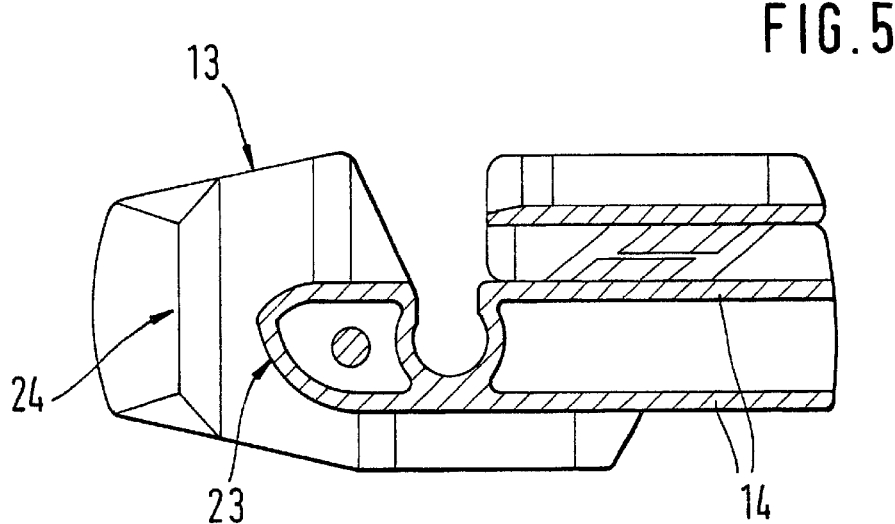
FIG. 5, a section through a connecting piece of the invention.

As FIG. 5 shows, the uppermost face 14a is joined to the middle face 14b in the region of the front end 16 along a radius 23. Inward-oriented protuberances 24 are located, opposite the walls 13, on the front end 16 of the connecting piece 10.

Figure 6:
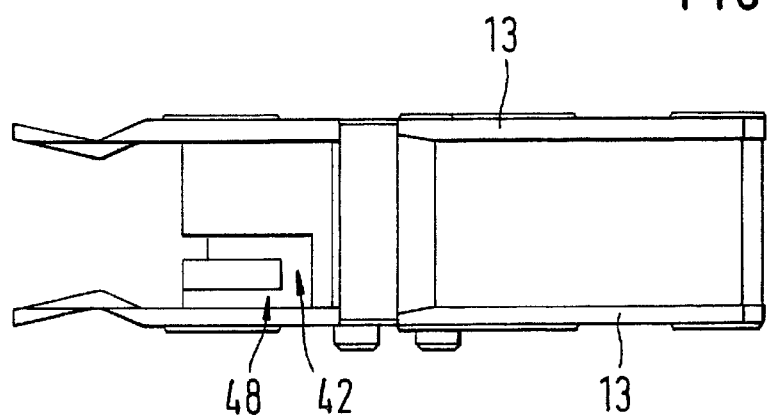
FIG. 6, a view from below of a connecting piece of the invention.

At the radius 23 of the connecting piece 10, as shown in FIGS. 3, 4 and 6, there is a second yielding region 41. The wall 13 at this point is recessed, as FIG. 4 shows, in such a way that a portion 44 of the radius 23 together with a projection 46 of the wall 13 can be bent elastically upward. The middle face 14b has a recess 42 of inverted L-shape, as viewed from the underside 20, in the region of the radius 23. Also located at the projection 46 of the wall 13 is a further lateral extension 48, which forms a second stop face 48a.

The transverse wall of the lowermost face 14c, which extends from the rear end 18 to the transverse groove 28, is also yielding, as can be seen in FIGS. 2 and 4, and forms a third elastic region 49. To that end, the two walls 13 have oblique slots 50, in such a way that the wall portions 51 that have the lowermost face 14c are joined to the walls 13 only by thin, leaf-springlike oblique ribs 52. Thus the lowermost face 14c, as a yielding plateau 53, can be displaced parallel in the direction of the middle face 14b.

In the paragraphs that follow, the function of the connecting piece 10 will be explained.

As shown in FIG. 1a, the wiper arm 11, on its end remote from the wiper motor 12, has a portion that is typically bent 180°. Depending on how the wiper arm 11 is embodied, the bend can have various radii R and a varying length L. The thickness D of the wiper arm 11 is equally variable.

The wiper blade 11a, at the point intended for connection to the wiper arm 11, has a fastening element 60, serving as a shaft, which is often a rivet or a roller rivet. The connecting piece 10 is slipped onto this fastening element 60 by its transverse groove 28, so that the fastening element 60 snaps into the circular recesses 30.

Figure 8:
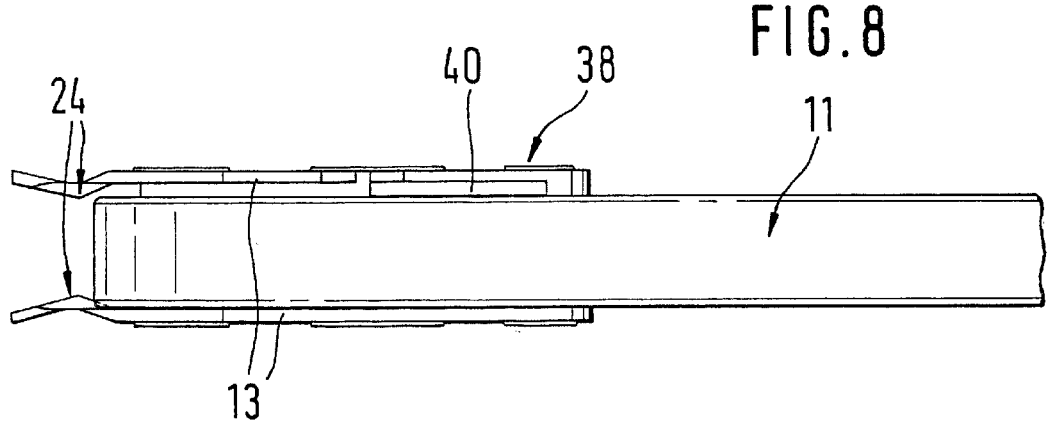
FIG. 8, a plan view on a connecting piece of the invention with a narrow wiper arm end.

If the wiper arm 11 has a width B that to the spacing between the wall 13, which is remote from the tab 38, and the first stop face 40a of the tab 38, then the wiper arm 11, after the insertion of the connecting piece 10, is retained both between the first stop face 40a and the opposed wall 13 on the top side and by the second extension 48, which is located on the same side as the first extension 40, and the opposed wall. Depending on the radius R of the bend of the wiper arm 11, the bent piece L of the wiper arm 11 can either come between the middle face 14b and the lower face 14c or can come into contact under the lowermost face 14c of the connecting piece 10. This is shown in FIGS. 7 and 8.

The gripper locking of the connecting piece 10 to the wiper arm 11 is brought about by the protuberances 24, which as part of resilient tongues press the connecting piece 10 against the radius 23. Because of the triangular shape of the protuberance 24, the most various wiper arm thicknesses D can be can be tightened by nonpositive engagement, in gripper fashion. This is shown in FIG. 9.

If the width B of the wiper arm 11 is greater than the inside spacing between the stop face 40a and the opposed wall 13, then when the connecting piece 10 is pulled onto the wiper arm 11, the resilient tab 38 is automatically pressed downward by the wedge-shaped extension 40 and retained directly by the piece of the wall 13 that protrudes past the sloping plane of the extension 40. The second yielding region 41 is also bent away by the second extension 48 (FIGS. 3 and 4), so that in addition to the locking between the radius 23 and the protuberance 24 of the connecting piece, a clamping tension is created between the second yielding region 41 and the uppermost face 14a. However, if the radius R of the wiper arm 11 is so large that the bent end is not inserted between the middle face 14b and the lowermost face 14c but instead slips underneath the lowermost face 14c, then the second yielding region 41 is not bent. In that case, an additional clamping tension can be brought about by the third yielding region 49, by embodying the lowermost face 14c as a yielding plateau 53. This is shown in FIGS. 10–13.

The direction of the slots 50 and thus of the ribs 52 is expediently selected such that to remove the connecting piece 10 from the wiper arm 11, first a resistance must be overcome, because the friction of the wiper arm 11 at the lowermost face 14c causes an increase in the contact pressure of the lower face 14c against the wiper arm 11. This is achieved because when the connecting piece 10 is pulled out of the wiper arm 11, the lowermost face 14c adheres slightly to the wiper arm 11, so that an erecting moment is exerted on the ribs 52. The ribs 52 become more steeply erect relative to the wiper arm 11, and as a result the spacing between the upper face 14a and the lower face 14c becomes greater, which increases the contact pressure.

Figure 12:
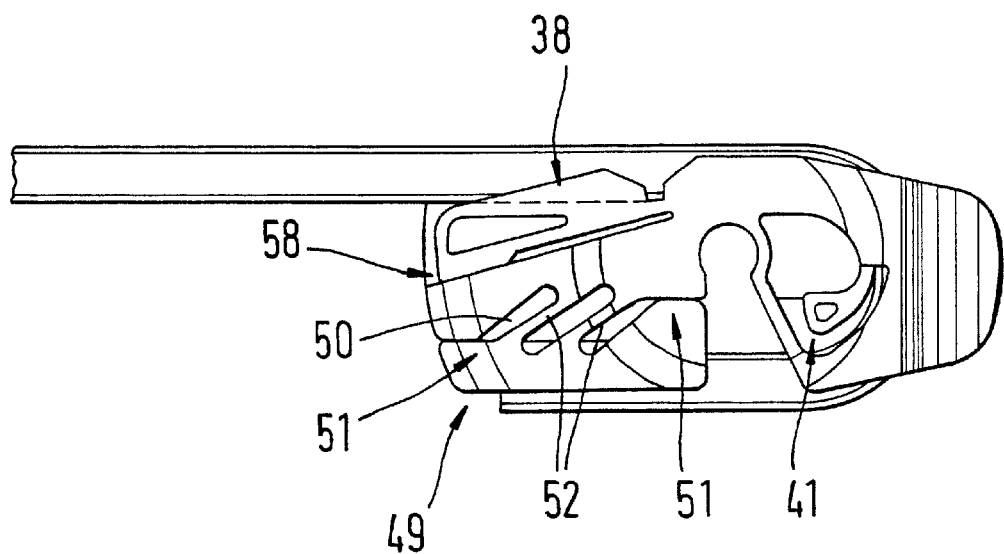
FIG. 12, a side view of a connecting piece of the invention on a wiper arm end with a large bending radius.
Figure 13:
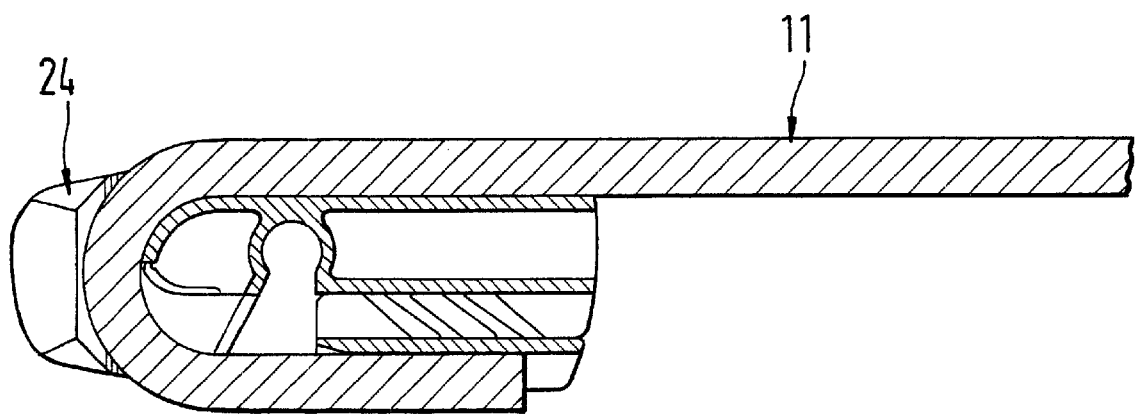
FIG. 13, a section through a connecting piece of the invention with a wide wiper arm end and a large bending radius.

The yielding regions 38, 41 and 49, to limit the yielding, have stabilizing elements 58, which are shown in FIG. 12. Thus the recess 36 is formed such that precisely whenever the sloping plane of the extension 40 is in the same plane as the upper face 14, or in other words the tab 38 is folded away toward the underside 20, the stabilizing element 58 at one point strikes the wall 13 or a face 14. In the face of the third elastic region 49, analogously, the wall portions 51 are formed such that a maximum adjustment path can be specified. In this way, the ribs 52 are protected against excessive stress and thus against breaking.

Figure 14:
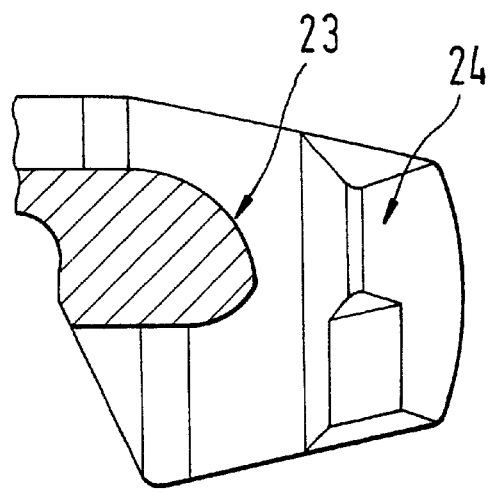
FIG. 14, a section through part of a connecting piece of the invention, in a variant.

The protuberances 24 on the resilient tongues of the walls 13 need not extend over the entire height of the connecting piece. For instance, as seen in FIG. 14, the protuberance 24 can extend over only part of the wall 13, so that the force required for installation can be adjusted.

Figure 15:
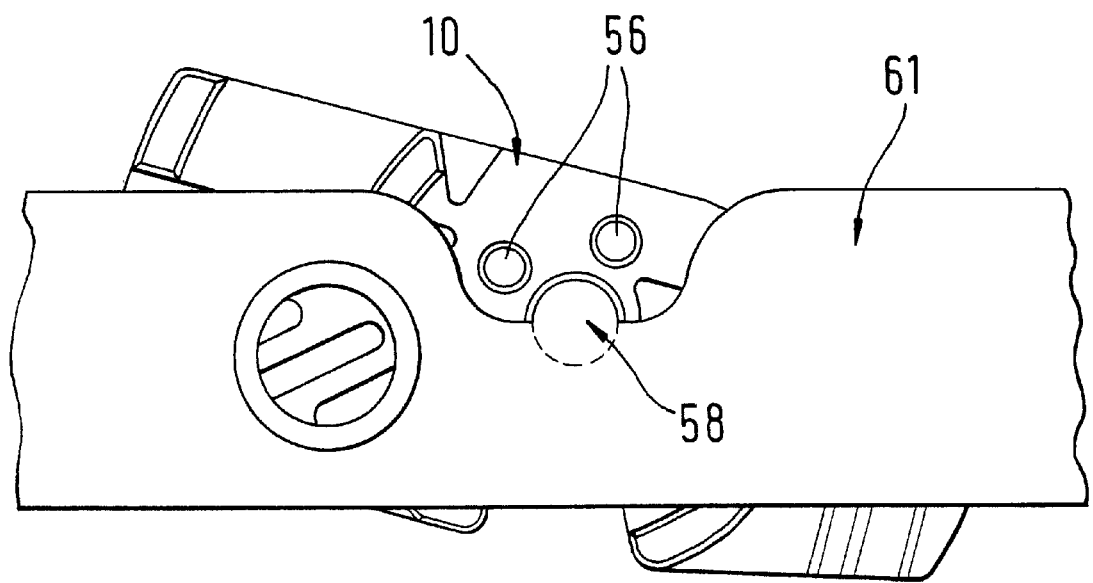
FIG. 15 is a side view of the wiper blade with a limited angle of rotation.

To limit the possible angle of rotation of the wiper blade 11a relative to the wiper arm 11, two peglike elements 56 extending perpendicular from the wall 13 are disposed in the region of the circular recesses 30 where the wiper blade 11a rotates as shown in FIG. 15. As shown in FIG. 1a, the arrangement is made such that when the maximum desired angle of rotation is reached, a rim of the box region 62 of the wiper blade 11a, in which the connecting piece 10 rotates, strikes one of the elements 56. For installing the wiper blade 11a, the connecting piece 10 does not have to be rotated out of the box region 62 of the middle bracket 61 of the wiper blade 11a.

What is claimed is:

1. A connecting piece (10) for connecting a wiper blade (11a) to a wiper arm (11), having a body that receives an end of the wiper arm (11), and having means for receiving and bracing the wiper blade, characterized in that on the body or on the means for receiving and bracing the wiper blade, regions (38, 41, 49) are provided, which are formed in yielding fashion for dimensional or tolerance compensation, wherein at least one of said yielding regions (38, 41, 49) is a resilient tab (38), said resilient tab (38) having at least two faces (40a, 13), wherein said at least two faces form stops for differently sized wiper arm ends (11) and wherein said at least two faces each can be transposed upon installation.

2. The connecting piece of claim 1, characterized in that the resilient tab (38) in a position folded out is braced by at least one stabilizing element (58).

3. The connecting piece of claim 1 characterized in that at least one resilient tab is embodied as a curved portion.

4. The connecting piece of claim 1, characterized in that at least one region (49) is embodied as a yielding plateau (53).

5. The connecting piece of claim 1, characterized in that the means for receiving and bracing the wiper blade (11a) have slots (50), wherein said slots (50) are positioned such that a resilient cross-sectional structure is created, wherein said resilient cross-sectional structure has the form of at least one rib (52).

6. The connecting piece of claim 5, characterized in that a plateau (53) defines a direction to the at least one rib (52) having an angle less than 90°.

7. The connecting piece of claim 1, characterized in that the body or the means for receiving and bracing the wiper blade (11a) has at least one elastic projection with at least one protuberance (24) for locking the wiper arm (11).

8. The connecting piece of claim 1, characterized in that the body or the means for receiving and bracing the wiper blade (11a) has at least one element (56) for limiting a twist angle between the wiper arm (11) and the wiper blade (11a).

9. The connecting piece of claim 1, characterized in that the body and the means for receiving and bracing the wiper blade (11a) have at least one element (56) for limiting a twist angle between the wiper arm (11) and the wiper blade (11a).

10. A connecting piece (10) for connecting a wiper blade (11a) to a wiper arm (11), having a body that receives an end of the wiper arm (11), and having means for receiving and bracing the wiper blade, characterized in mat on the body and on the means for receiving and bracing the wiper blade, region, (38, 41, 49) are provided, which are formed in yielding fashion for dimensional and tolerance compensation, wherein at least one of said yielding regions (38, 41, 49) is a resilient tab (38), said resilient tab (38) having at least two faces (40a, 13), wherein said at least two faces form stops for differently sized wiper arm ends (11) and wherein said at least two faces each can be transposed upon installation.

* * * * *